United States Patent
Po et al.

(10) Patent No.: US 11,109,173 B2
(45) Date of Patent: *Aug. 31, 2021

(54) METHOD TO DETERMINE LOUDSPEAKER CHANGE OF PLACEMENT

(71) Applicant: Apple Inc., Cupertino, CA (US)

(72) Inventors: Bruce C. Po, Los Altos, CA (US); Richard M. Powell, Mountain View, CA (US); Aram M. Lindahl, Menlo Park, CA (US); Baptiste P. Paquier, Saratoga, CA (US); Phillip A. Kamp, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,634

(22) Filed: Jan. 31, 2020

(65) Prior Publication Data

US 2020/0245088 A1 Jul. 30, 2020

Related U.S. Application Data

(63) Continuation of application No. 15/514,455, filed as application No. PCT/US2015/053014 on Sep. 29, 2015, now Pat. No. 10,567,901.

(Continued)

(51) Int. Cl.
*H04S 7/00* (2006.01)
*G06F 3/16* (2006.01)
(Continued)

(52) U.S. Cl.
CPC .............. *H04S 7/302* (2013.01); *G06F 3/162* (2013.01); *G06F 3/165* (2013.01); *H04R 1/403* (2013.01);
(Continued)

(58) Field of Classification Search
CPC .......... H04R 1/227; H04R 1/403; H04R 3/04; H04R 3/12; H04R 5/04; H04R 29/007;
(Continued)

(56) References Cited

U.S. PATENT DOCUMENTS 9,084,058 B2 7/2015 Reilly et al.
9,521,487 B2 12/2016 Oishi et al.
(Continued)

FOREIGN PATENT DOCUMENTS

| | | |
|---|---|---|
| CN | 102696239 | 9/2012 |
| EP | 2557813 | 2/2013 |
| WO | 2014138134 | 9/2014 |

OTHER PUBLICATIONS

Board Opinion for Chinese Application No. 2015800644073 dated Jan. 20, 2021, 21 pages.

(Continued)

*Primary Examiner* — Jason R Kurr
(74) *Attorney, Agent, or Firm* — Womble Bond Dickinson (US) LLP

(57) ABSTRACT

A system and method is described for determining whether a loudspeaker device has relocated, tilted, rotated, or changed environment such that one or more parameters for driving the loudspeaker may be modified and/or a complete reconfiguration of the loudspeaker system may be performed. In one embodiment, the system may include a set of sensors. The sensors provide readings that are analyzed to determine 1) whether the loudspeaker has moved since a previous analysis and/or 2) a distance of movement and/or a degree change in orientation of the loudspeaker since the previous analysis. Upon determining the level of movement is below a threshold value, the system adjusts previous parameters used to drive one or more of the loudspeakers. By adjusting previous parameters instead of performing a complete recalibration, the system provides a more efficient (Continued)

technique for ensuring that the loudspeakers continue to produce accurate sound for the listener.

18 Claims, 9 Drawing Sheets

Related U.S. Application Data

(60) Provisional application No. 62/057,999, filed on Sep. 30, 2014.

(51) Int. Cl.
  *H04R 1/40* (2006.01)
  *H04R 3/04* (2006.01)
  *H04R 3/12* (2006.01)
  *H04R 5/04* (2006.01)
  *H04R 29/00* (2006.01)

(52) U.S. Cl.
  CPC ............... *H04R 3/04* (2013.01); *H04R 3/12* (2013.01); *H04S 7/30* (2013.01); *H04R 5/04* (2013.01); *H04R 29/007* (2013.01); *H04R 2201/025* (2013.01); *H04R 2201/405* (2013.01); *H04S 7/301* (2013.01)

(58) Field of Classification Search
  CPC ........ H04R 2201/025; H04R 2201/405; H04R 2499/11; H04S 7/30; H04S 7/301; H04S 7/302; H04S 7/303; G06F 3/162; G06F 3/165
  See application file for complete search history.

(56) References Cited

U.S. PATENT DOCUMENTS

| | | | |
|---|---|---|---|
| 9,538,205 B2 | 1/2017 | Ikai et al. | |
| 9,668,049 B2 | 5/2017 | Wilberding et al. | |
| 9,690,271 B2 | 6/2017 | Sheen et al. | |
| 9,743,208 B2 | 8/2017 | Oishi et al. | |
| 2010/0322435 A1* | 12/2010 | Suzuki | G01S 5/18 381/92 |
| 2012/0114151 A1 | 5/2012 | Nguyen et al. | |
| 2013/0039527 A1* | 2/2013 | Jensen | H04R 1/24 381/387 |
| 2013/0279706 A1 | 10/2013 | Marti | |
| 2015/0237446 A1* | 8/2015 | Katayama | H04S 3/008 381/163 |

OTHER PUBLICATIONS

Extended European Search Report for European Application No. 20199605.5 dated Feb. 17, 2021, 8 pages.

* cited by examiner

METHOD TO DETERMINE LOUDSPEAKER CHANGE OF PLACEMENT

This application is a continuation of pending U.S. application Ser. No. 15/514,455 filed Mar. 24, 2017, which is National Stage Entry of International application number PCT/US2015/053014 filed Sep. 29, 2015, which claims the benefit of U.S. Provisional Patent Application No. 62/057,999, filed Sep. 30, 2014, and this application hereby incorporates herein by reference that provisional patent application.

FIELD

A system and method is disclosed for determining whether a loudspeaker device has relocated, tilted, rotated, or otherwise been moved such that one or more parameters for driving the loudspeaker may be modified and/or a complete reconfiguration of the loudspeaker or the loudspeaker system may be performed. Other embodiments are also described.

BACKGROUND

Loudspeakers are often used by computers and home electronics for outputting sound into a listening area. Each loudspeaker may be composed of one or more transducers that are arranged on a single plane or surface of an associated cabinet or casing. To properly direct sound at one or more listeners, these loudspeakers must be manually oriented such that sound produced by each loudspeaker is aimed as intended. This orientation may include applying particular drive settings or other configuration parameters for each of the one or more transducers in the loudspeaker. For example, a loudspeaker may be initially oriented and configured such that corresponding transducers produce a sound beam directed at a listener. However, any movement of the loudspeaker may require 1) manual adjustment of drive settings or 2) a complete recalibration of the system such that the generated sounds are again properly aimed at the target listener. Accordingly, in these traditional systems, the listener must manually determine that one or more of the loudspeakers has moved such that recalibration and or adjustment may be performed. This repeated manual determination of movement and corresponding adjustment may become time consuming and may provide a poor user experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A system and method is disclosed for determining whether a loudspeaker device has relocated, tilted, rotated, or changed environment such that one or more parameters for driving the loudspeaker may be modified and/or a complete reconfiguration of the loudspeaker or the loudspeaker system may be performed. In one embodiment, the system may include a set of sensors integrated or otherwise in communication with a loudspeaker. In one embodiment, the sensors may include one or more of a video camera, a still image camera, a compass, an accelerometer, a light sensor, a wireless antenna, a thermometer, current/voltage monitor, a microphone, a gyroscope, and barometer/pressure monitor. In other embodiments, other sensing devices may be integrated or otherwise in communication with the loudspeaker.

The sensors may provide various readings that are analyzed to determine 1) whether the loudspeaker has moved since a previous analysis and/or 2) a distance of movement and/or a degree change in orientation of the loudspeaker since the previous analysis. Upon determining that the level of movement is below a threshold value, the system and method attempts to adjust previous parameters used to drive one or more of the loudspeakers. By adjusting previous parameters instead of performing a complete recalibration, the system and method provides a more efficient technique for ensuring that the loudspeakers continue to produce accurate sound at the location of a listener despite small movements/changes. However, upon determining larger or non-quantifiable movements/changes, the system and method may trigger a full recalibration of one or more of the loudspeakers. Accordingly, the system and method described herein provides a more robust routine for adjustment of loudspeakers based on varied levels of movement and changes.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
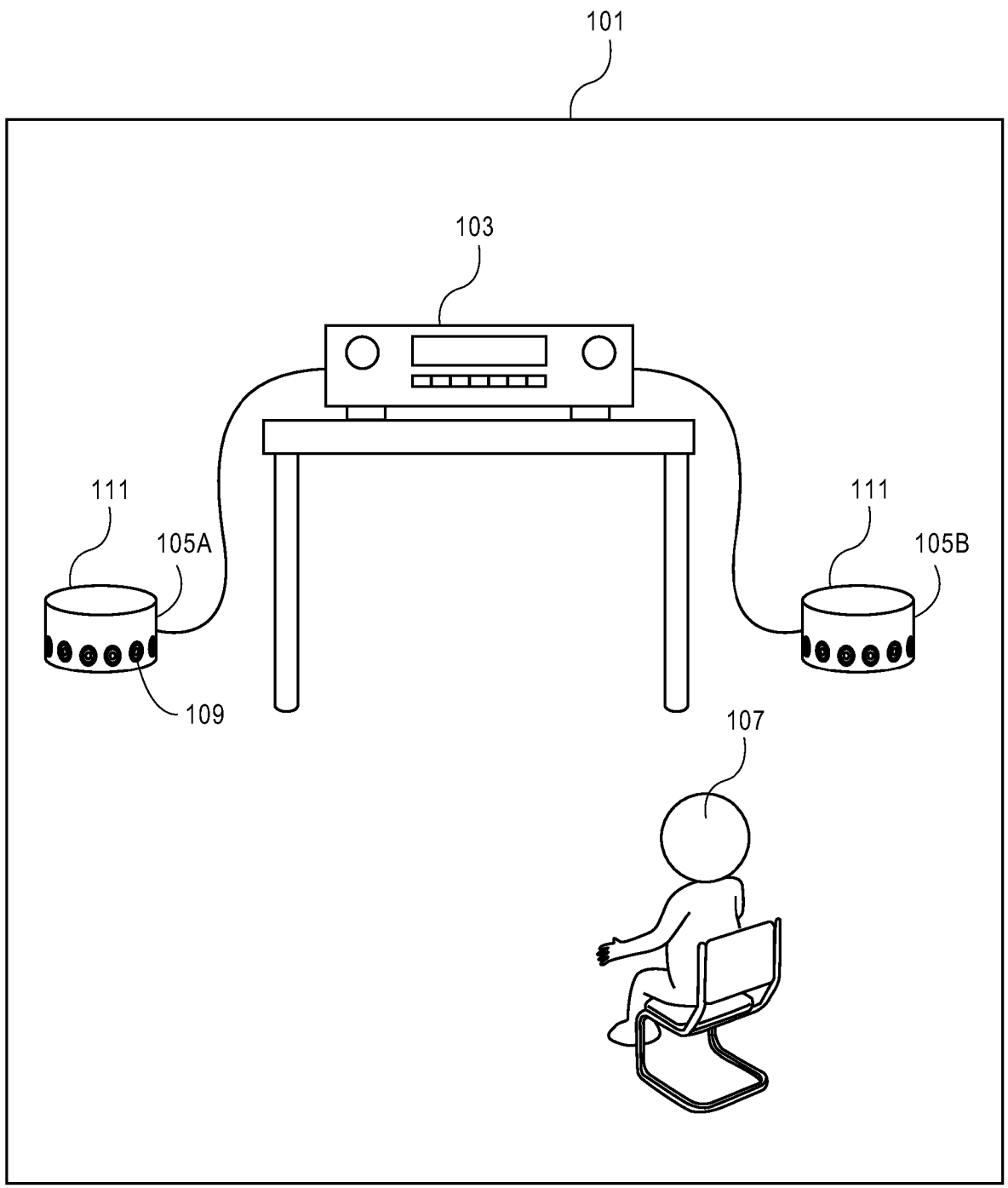
FIG. 1 shows a view of a listening area with an audio receiver, a set of loudspeakers, and a listener according to one embodiment.

FIG. 1 shows a view of a listening area 101 with an audio receiver 103, a set of loudspeakers 105A and 105B, and a listener 107. The audio receiver 103 may be coupled to the loudspeakers 105A and 105B to drive individual transducers 109 in the loudspeakers 105A and 105B to emit various sound beam patterns or other sounds into the listening area 101. In one embodiment, the loudspeakers 105A and 105B may be configured to generate beam patterns that represent individual channels of a piece of sound program content. For example, the loudspeakers 105A and 105B may generate beam patterns that represent front left, front right, and front center channels of a piece of sound program content (e.g., a musical composition or an audio track for a movie).

Figure 2A:
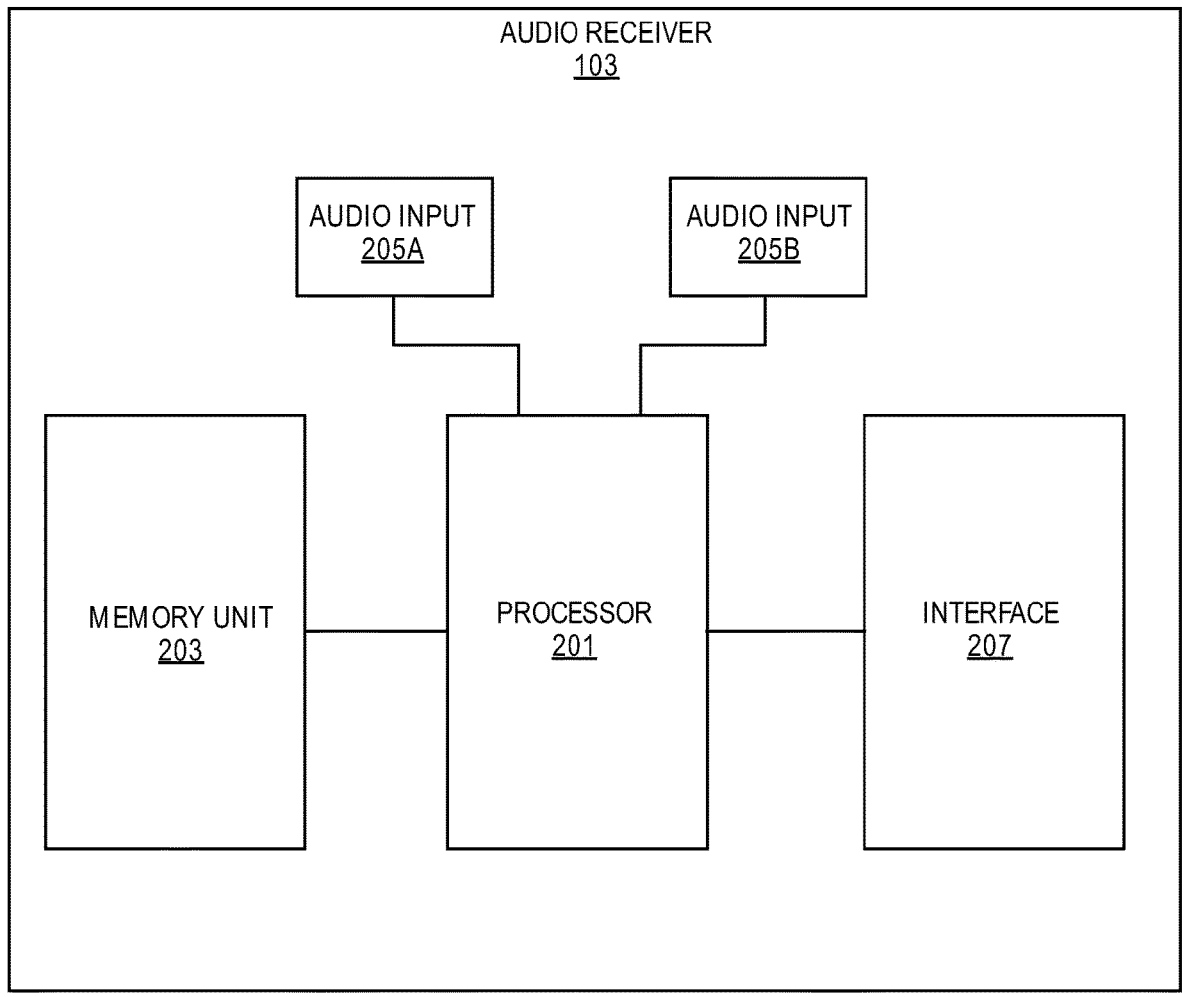
FIG. 2A shows a component diagram of the audio receiver according to one embodiment.

FIG. 2A shows a component diagram of the audio receiver 103 according to one embodiment. The audio receiver 103 may be any electronic device that is capable of driving one or more transducers 109 in the loudspeakers 105A and 105B. For example, the audio receiver 103 may be a desktop computer, a laptop computer, a tablet computer, a home theater receiver, a set-top box, and/or a mobile device (e.g., a smartphone). The audio receiver 103 may include a hardware processor 201 and a memory unit 203.

The processor 201 and the memory unit 203 are generically used here to refer to any suitable combination of programmable data processing components and data storage that conduct the operations needed to implement the various functions and operations of the audio receiver 103. The processor 201 may be an applications processor typically found in a smart phone, while the memory unit 203 may refer to microelectronic, non-volatile random access memory. An operating system may be stored in the memory unit 203 along with application programs specific to the various functions of the audio receiver 103, which are to be run or executed by the processor 201 to perform the various functions of the audio receiver 103.

The audio receiver 103 may include one or more audio inputs 205 for receiving audio signals from an external and/or a remote device. For example, the audio receiver 103 may receive audio signals from a streaming media service and/or a remote server. The audio signals may represent one or more channels of a piece of sound program content (e.g., a musical composition or an audio track for a movie). For example, a single signal corresponding to a single channel of a piece of multichannel sound program content may be received by an input 205 of the audio receiver 103. In another example, a single signal may correspond to multiple channels of a piece of sound program content, which are multiplexed onto the single signal.

In one embodiment, the audio receiver 103 may include a digital audio input 205A that receives digital audio signals from an external audio device and/or a remote device. For example, the audio input 205A may be a TOSLINK connector, a High Definition Multimedia Interface (HDMI), or a digital wireless interface (e.g., a wireless local area network (WLAN) adapter or a Bluetooth receiver). In one embodiment, the audio receiver 103 may include an analog audio input 205B that receives analog audio signals from an external device. For example, the audio input 205B may be a binding post, a Fahnestock clip, or a phono plug that is designed to receive a wire or conduit and a corresponding analog signal.

In one embodiment, the audio receiver 103 may include an interface 207 for communicating with the loudspeakers 105A and 105B. The interface 207 may utilize wired mediums (e.g., conduit or wire) to communicate with the loudspeakers 105A and 105B, as shown in FIG. 1. In another embodiment, the interface 207 may communicate with the loudspeaker array 105 through a wireless connection. For example, the network interface 207 may utilize one or more wireless protocols and standards for communicating with the loudspeakers 105A and 105B, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

Figure 2B:
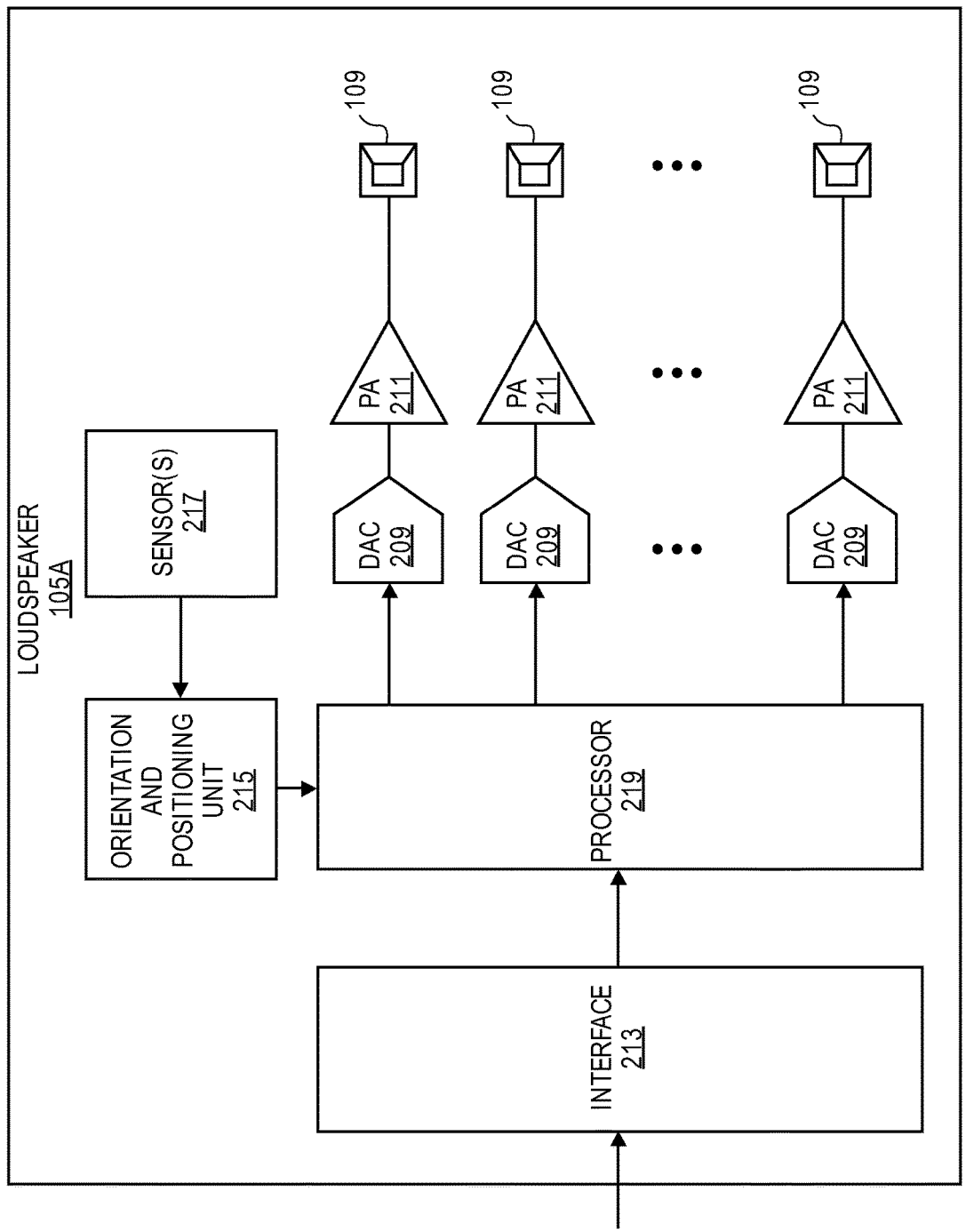
FIG. 2B shows a component diagram of a loudspeaker according to one embodiment.

FIG. 2B shows a component diagram of the loudspeaker 105A according to one embodiment. The loudspeaker 105B may be similarly or identically configured in relation to the loudspeaker 105A. As shown in FIG. 2B, the loudspeaker 105A may receive drive signals from the audio receiver 103 through a corresponding interface 213 and drive each of the transducers 109 in the loudspeaker 105A. As with the interface 207, the interface 213 may utilize wired protocols and standards and/or one or more wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards. In some embodiments, the loudspeaker 105A may include digital-to-analog converters 209 and power amplifiers 211 for driving each transducer 109 in the loudspeaker 105A.

As shown in FIG. 1, the loudspeakers 105A and 105B house multiple transducers 109 in corresponding cabinets 111. As shown, the cabinets 111 are cylindrical; however, in other embodiments the cabinets 111 may be in any shape, including a polyhedron, a frustum, a cone, a pyramid, a triangular prism, a hexagonal prism, a sphere, or a frusto conical shape, all of which may have the symmetric properties referred to below in connection with FIG. 3 and FIG. 4.

Figure 3:
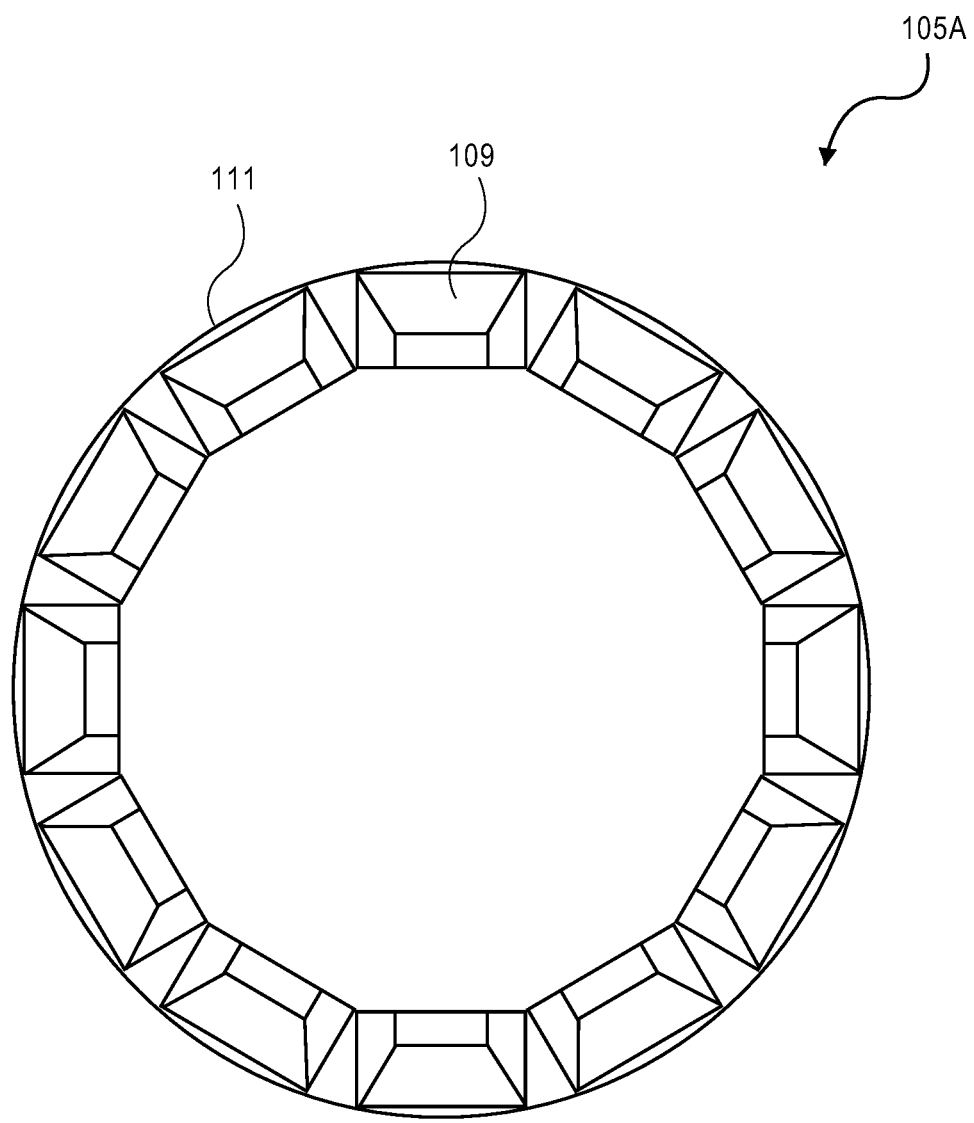
FIG. 3 shows an overhead, cutaway view of a loudspeaker according to one embodiment.
Figure 4:
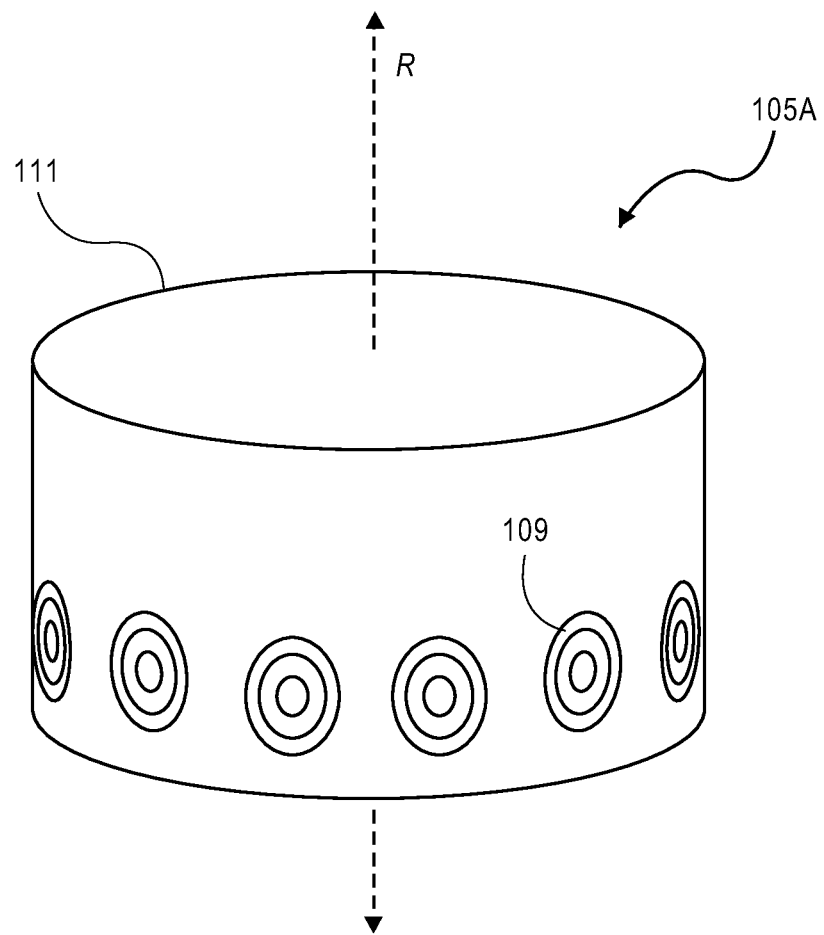
FIG. 4 shows the symmetrical properties of a loudspeaker according to one embodiment.

FIG. 3 shows an overhead, cutaway view of the loudspeaker 105A according to one embodiment. As shown in FIGS. 1 and 3, the transducers 109 in the loudspeaker 105A encircle the cabinet 111 such that transducers 109 may cover the curved face of the cabinet 111 and are together positioned as a single ring, as shown. Accordingly, the loudspeaker 105A maintains vertical symmetry around a vertical axis R as shown in FIG. 4. This vertical symmetry allows the loudspeaker array 105A to be rotated around the vertical axis R while maintaining a consistent arrangement of transducers 109 directed in relation to the listener 107. In some embodiments, the loudspeaker array 105A may have multiple degrees of symmetry (e.g., horizontal symmetry around a horizontal axis).

The transducers 109 may be any combination of full-range drivers, mid-range drivers, subwoofers, woofers, and tweeters. Each of the transducers 109 may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' 109 magnetic system interact, generating a mechanical force that causes the coil (and thus, the attached cone) to move back and forth, thereby reproducing sound under the control of the applied electrical audio signal coming from an audio source, such as the audio receiver 103. This driving of the transducers 109 of the loudspeaker 105a may be "started" by the audio source (e.g., the audio receiver 103), and as such the audio source may also be referred to as driving the transducers 109 or driving the loudspeaker 105a. Although electromagnetic dynamic loudspeaker drivers are described for use as the transducers 109, those skilled in the art will recognize that other types of loudspeaker drivers, such as piezoelectric, planar electromagnetic and electrostatic drivers are possible. Further, although shown and described as including multiple transducers 109 and operating as an array, in some embodiments the loudspeaker 105A may include a single transducer 109. Although FIG. 1 shows each of the loudspeakers 105A, 105B as having its transducers 109 arranged in a single ring that lies in a plane and extends along a circumference of the cabinet 111, and may be driven as an array, the loudspeaker 105A may alternatively have more than one ring of transducers that can be driven as an array.

Figure 5:
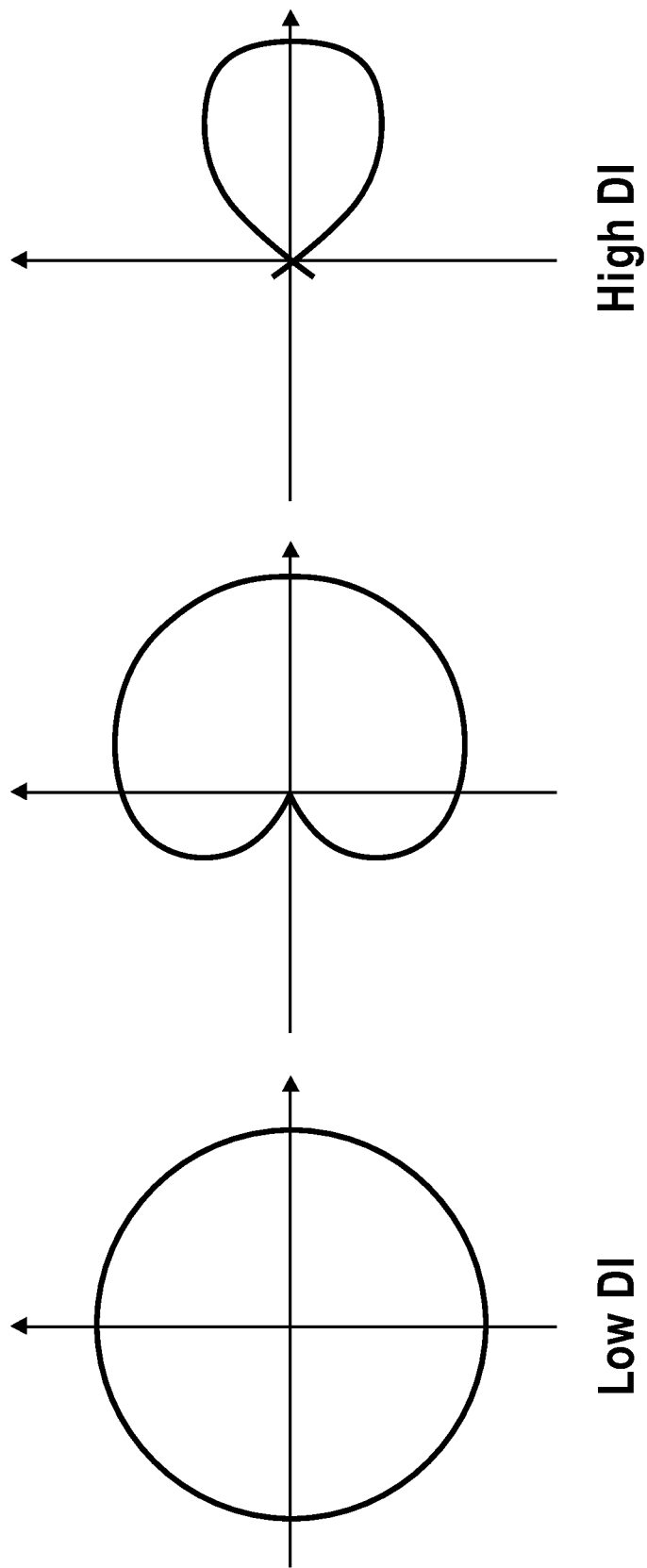
FIG. 5 shows a set of directivity patterns that may be generated by a loudspeaker according to one embodiment.

Each transducer 109 may be individually and separately driven to produce sound in response to a separate or discrete audio signal received from an audio source (e.g., the audio receiver 103). By allowing the transducers 109 in the loudspeaker 105A to be individually and separately driven according to different parameters and settings (including delays and energy levels), the loudspeaker 105A may produce numerous directivity/beam patterns that accurately represent each channel of a piece of sound program content output by the audio receiver 103. For example, in one embodiment, the loudspeaker 105A may produce one or more of the directivity patterns shown in FIG. 5.

In one embodiment, the loudspeaker 105A may be configurable based on the position and orientation of the loudspeaker 105A relative to other objects/surfaces in the listening area 101 and/or in relation to other characteristics of the listening area 101. For example, the loudspeaker 105A may be associated with a set of parameters for driving its transducers 109 to produce beam patterns or other sound formations. The parameters may for example define the relative phase (or delay) and relative gain of the digital transducer drive signals (e.g., as computed by a digital beamforming process to obtain one or more beam patterns that are produced by the loudspeaker 105a), which drive the transducers 109, respectively. The parameters may be set to accommodate for characteristics of the environment in which the loudspeaker 105A is located. For instance, the parameters may accommodate for 1) reflections caused by surfaces in the listening area 101 (e.g., walls, the ceiling, and the floor) and/or objects within the listening area 101 (e.g., furniture); 2) distance between the loudspeaker 105A and the loudspeaker 105B; 3) the ambient temperature, ambient pressure, and/or ambient light level surrounding the loudspeaker 105A 4) current/voltage levels of a power outlet to which the loudspeaker 105A and/or the loudspeaker 105B are attached and/or 5) proximity of the loudspeaker 105A to the listener 107. By accommodating for these factors, the parameters allow the loudspeaker 105A to more accurately produce sound in the changing environment in which the loudspeaker 105A is situated.

In one embodiment, the loudspeaker 105A may include an orientation and positioning unit 215 (see FIG. 2b) for determining whether the loudspeaker 105A has relocated, tilted, rotated, or the environment surrounding the loudspeaker 105A has otherwise changed in relation to a previous configuration/setup. In one embodiment, in response to determining that the loudspeaker 105A has moved (e.g., its orientation about the vertical axis R has been altered), the orientation and positioning unit 215 may determine a new set of parameters, to apply to the loudspeaker 105A using a processor 219. In one embodiment, the latter may adjust the individual, digital transducer drive signals (of the transducers 109, respectively,) before the drive signals are converted into analog form and amplified (by digital to analog converters 209 and power amplifiers 211) at the inputs of the transducers 109. The new set of parameters accommodates for the changed environment in which the loudspeaker 105A is now within (e.g., movement to a new location within the listening area 101 or a changed orientation relative to other objects/surfaces in the listening area 101 and the listener 107). In some embodiments, when the level/degree of movement (including for example a change in orientation) extends beyond a set of thresholds, the orientation and positioning unit 215 may instead determine that a full recalibration of the loudspeaker 105A and/or the loudspeaker 105B needs to be performed. By allowing discretion as to whether to perform a) only an adjustment of the current parameters based on "small" movements of the loudspeaker 105A or b) full recalibration of the system in response to "large" movements of the loudspeaker 105A, the orientation and positioning unit 215 provides a more efficient technique for maintaining sound accuracy.

In one embodiment, the loudspeaker 105A may include a set of sensors 217. In this embodiment, one or more inputs from the sensors 217 may be used by the unit 215 for assisting in 1) determining whether the loudspeaker 105A has moved or the environment has changed; 2) adjusting a previous set of parameters for the loudspeaker 105A and/or the loudspeaker 105B; and 3) determining whether a full recalibration of the loudspeaker 105A and/or the loudspeaker array 105B needs to be performed. In one embodiment, the sensors 217 may include one or more of a video camera, a still image camera, a compass, an accelerometer, a light sensor, a wireless antenna, a thermometer, current/voltage monitor, a microphone, a gyroscope, and barometer/pressure monitor. In other embodiments, other sensing devices may be integrated within the cabinet 111 or otherwise in communication with the loudspeaker 105A.

Although described and shown in relation to the loudspeaker 105A, as noted above, in some embodiments the loudspeaker 105B may be similarly or identically configured. Further, although described and shown as being separate from the audio receiver 103, in some embodiments, one or more components of the audio receiver 103 may be integrated within the loudspeaker 105A. For example, the loudspeaker 105A may further include the hardware processor 201, the memory unit 203, and the one or more audio inputs 205. In this embodiment, the orientation and positioning unit 215 may be implemented as software stored in the memory unit 203 that suitably programs the processor 201, or even as software that programs the processor 219 (see FIG. 2b). However, in other embodiments, the positioning unit 215 may be implemented as one or more separate hardware circuits.

Figure 6:
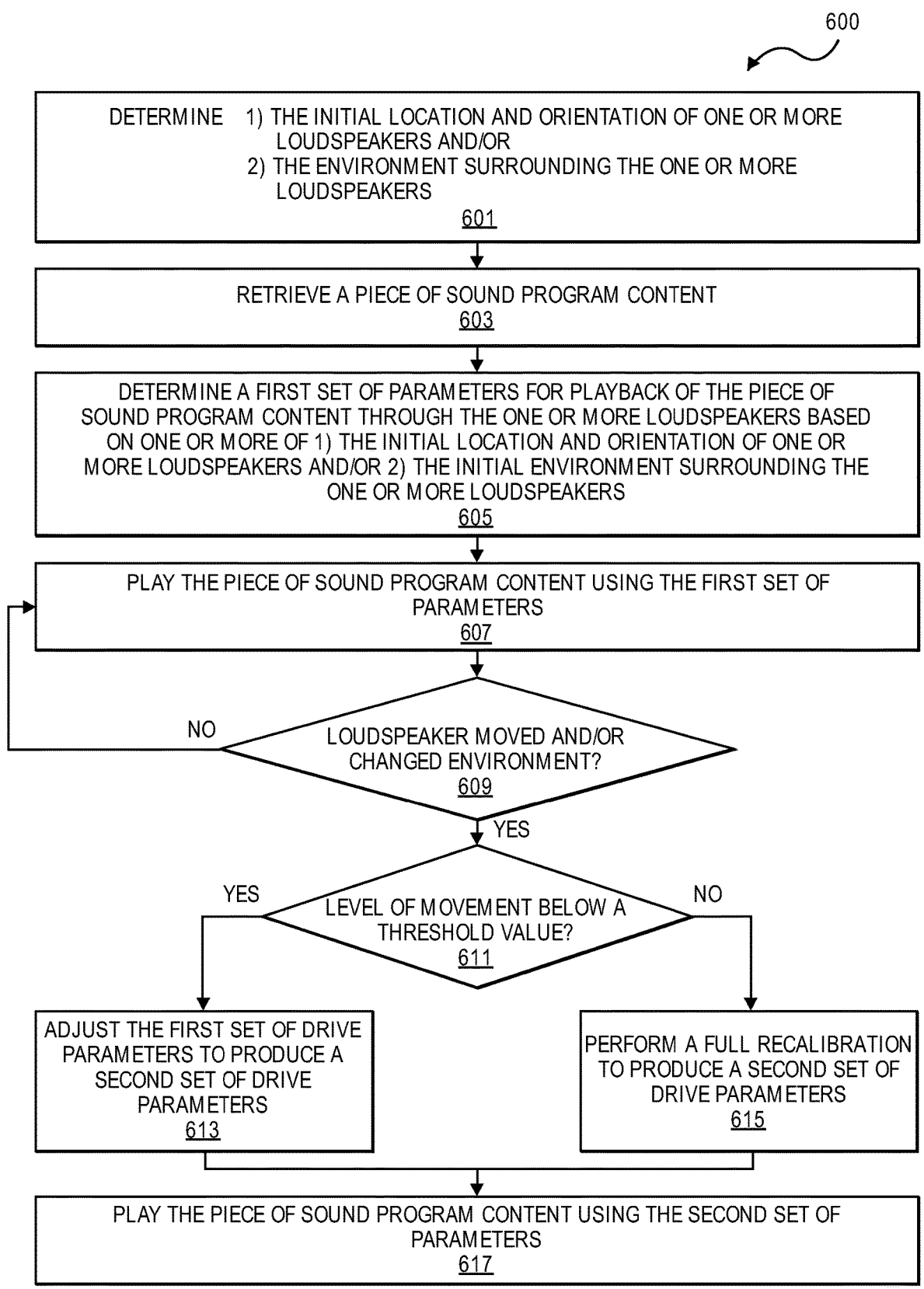
FIG. 6 shows a method for configuring a loudspeaker based on detected movement and/or changes to the environment of the loudspeaker according to one embodiment.

Turning now to FIG. 6, a method 600 for configuring the loudspeaker 105A and/or the loudspeaker 105B will be described. In one embodiment, the method 600 determines whether the loudspeaker 105A has been relocated, tilted, rotated, or the environment surrounding the loudspeaker 105A has changed based on a set of inputs from the sensors 217. Following a determination that the loudspeaker 105A has moved, the method 600 may in response 1) modify parameters for driving each of the transducers 109 (without again ascertaining the complete environment that is surrounding the loudspeakers 105a, 105b) or 2) trigger a complete recalibration of the loudspeaker 105A and/or the loudspeaker 105B (during which, for example, the complete environment surrounding the loudspeakers 105a, 105b is ascertained by using a device, e.g., another camera or a microphone array that is separate from the loudspeakers 105a, 105b and separate from the audio receiver 103; this may include determining the location of one of the loudspeakers relative to another.)

Although shown and described in a particular order, in other embodiments the operations of the method 600 may be performed in a different order. For example, in some embodiments, one or more operations of the method 600 may be performed during overlapping time periods.

Each operation of the method 600 may be performed by one or more components of the audio receiver 103, the loudspeaker 105A, and/or another device operating within the listening area 101. For example, in one embodiment one or more operations of the method 600 may be performed by the orientation and positioning unit 215 based on a set of inputs from the sensors 217. Each operation of the method 600 will now be described by way of example below.

The method 600 may commence at operation 601 with the determination of 1) the initial location and orientation of the loudspeakers 105A and/or 105B and/or 2) the environment surrounding the loudspeakers 105A and/or 105B. The location/orientation and environmental characteristics may be determined at operation 601 through the performance of an initial calibration of the loudspeakers 105A and 105B and/or the audio receiver 103 in the listening area 101. For example, during installation/placement of the loudspeakers 105A and 105B in the listening area 101, a full calibration routine may be performed. The calibration routine determines 1) the location of the loudspeakers 105A and 105B in the listening area 101 and their orientation relative to a target (e.g., the listener 107) and/or other objects (e.g., the other loudspeaker 105A/105B) and/or 2) characteristics of the environment surrounding the loudspeaker 105A, the loudspeaker 105B, and/or the listener 107. These characteristics may include the ambient temperature, ambient pressure, and ambient light level surrounding the loudspeaker 105A and/or the loudspeaker 105B, and/or the current/voltage levels of a power outlet to which the loudspeaker 105A and/or the loudspeaker 105B are attached.

In one embodiment, the calibration routine may be performed through a series of audible or inaudible sounds played through the loudspeakers 105A and 105B and detected by a separate, listening device (e.g., a standalone microphone or microphone array, or a microphone or microphone array that is integrated within a mobile device such as a smartphone, a headset, or a tablet computer that is located near the listener 107 or at an intended location of the listener 107). In this embodiment, each of the transducers 109 in the loudspeakers 105A and 105B may be separately driven to produce separate sounds during separate or overlapping time intervals. Based on the time of arrival and level differences between respective, detected sounds, the calibration routine may determine the relative location and orientation of the loudspeakers 105A and 105B.

Although described in relation to use of sounds and a microphone, in other embodiments the calibration routine at operation 601 may use other techniques for determining the location, orientation, and environment of the loudspeakers 105A and 105B. For example, a video or still image taken by a separate camera device, from a suitable distance away from the loudspeakers 105a, 105b, may capture the entire listening area 101 within its field of view, including the loudspeakers 105A and 105B and/or the listener 107. Based on object recognition processes performed upon these captured videos/images, the relative location and orientation of the loudspeakers 105A and 105B may be determined.

In some embodiments, data from the built-in sensors 217 may be used in operation 601. For example, based on values received from the sensors 217, operation 601 may determine 1) the initial location and orientation of the loudspeakers 105A and/or 105B and 2) the initial environment in which the loudspeakers 105A and/or 105B are located.

At operation 603, a piece of sound program content may be received or retrieved such that this piece of content may be played through the loudspeakers 105A and/or 105B. The piece of sound program content may represent a musical composition, an audio track for a movie, or any other similar sound recording that is to be played to the listener 107 in the listening area 101 through the loudspeakers 105A and/or 105B.

The piece of sound program content may be received at operation 603 from various sources, including streaming internet services, set-top boxes, local or remote computers, and personal audio and video devices, via one or more of the inputs 205 of the audio receiver 103. Although described as the piece of sound program content being received from a remote or an external source, in some embodiments the piece of sound program content may alternatively be "local" to the audio receiver 103 and thus originate from or be generated by the audio receiver 103 and/or the loudspeaker 105A. For example, the piece of sound program content may be stored in the memory unit 203 of the audio receiver 103, and is retrieved at operation 603.

At operation 605, a first set of parameters may be determined for playback of the piece of sound program content through the loudspeakers 105A and/or 105B. The first set of parameters may include delays, level differences, gain values, and/or phase values for driving each of the transducers 109 in the loudspeakers 105A and/or 105B. In one embodiment, the first set of parameters are generated based on the determined 1) initial location and orientation of the loudspeakers 105A and/or 105B and 2) initial environment in which the loudspeakers 105A and/or 105B are located. In this embodiment, the first set of parameters allow the loudspeakers 105A and 105B to produce an intended set of sounds at the location of the listener 107 based on the initial positioning and orientation of the loudspeakers 105A and 105B relative to objects/structures and the listener 107 and the initial environment surrounding the loudspeakers 105A and/or 105B. For example, the first set of parameters may be used by the loudspeaker 105A and 105B to generate beam patterns, which each represent separate channels for the piece of sound program content. In one embodiment, a beamforming process is performed to produce the first set of parameters such that they enable the loudspeaker 105a (or loudspeaker 105b, or both) to generate the desired beam patterns, in view of the initial positioning and orientation of the loudspeakers 105a, 105b that was determined in operation 601. In one embodiment, the beamforming process may be performed by suitably programming the processor 201 of the audio receiver 103, and the first set parameters may then be provided to the processor 219 in the loudspeaker 105a, 105b (which may then deliver the individual, transducer drive signals in digital form to the DACs 209.)

Following determination of the first set of parameters, operation 607 may play the piece of sound program content received at operation 603 using the parameters determined at operation 605. As noted above, the first set of parameters allows the production of an intended set of sounds at the location of the listener 107. For example, as noted above, the first set of parameters may allow the production of separate sound beams corresponding to respective audio channels for the piece of sound program content.

Since the parameters were generated based on the positioning and orientation of the loudspeakers 105A and 105B in relation to each other, in relation to the listener 107, and/or in relation to other objects and structures in the listening area 101, the sound generated at operation 607 may accurately represent the desired sound scene presented by the piece of sound program content. However, since the first set of parameters were tightly associated with the location, orientation, and current environment of the loudspeakers 105A and 105B, any movement by one or more of the loudspeakers 105A and 105B may result in an inaccurate or non-ideal sound experience for the listener 107.

In an attempt to compensate for movement of the loudspeakers 105A and/or 105B, operation 609 may determine if one or more of the loudspeakers 105A and 105B have relocated, tilted, rotated, or otherwise been moved and/or if the environment surrounding the loudspeakers 105A and/105B has changed. If no change has occurred, the method 600 may move back to operation 607 to continue playing the piece of sound program content using the first set of parameters.

In one embodiment, operation 609 may determine this movement/changed environment based on inputs from one or more of the sensors 217. The movement may include both vertical and horizontal changes in the listening area 101. As noted above, in one embodiment, the sensors 217 may include one or more of a video camera, a still image camera, a compass, an accelerometer, a light sensor, a wireless antenna, a thermometer, current/voltage monitor, a microphone, a gyroscope, and barometer/pressure monitor. Inputs from each of these sensors 217 will be described by way of example below. In other embodiments, other types of sensors may be used to detect movement/changed environment of the loudspeakers 105A and/or 105B.

Although described below in relation to the loudspeaker 105A, the sensors described may operate similarly with respect to the loudspeaker 105B. Accordingly, detecting movement of either one of the loudspeakers 105A and 105B may trigger adjustment of the first set of parameters, or a full recalibration, for both of the loudspeakers 105A and 105B.

Cameras

Figure 7A:
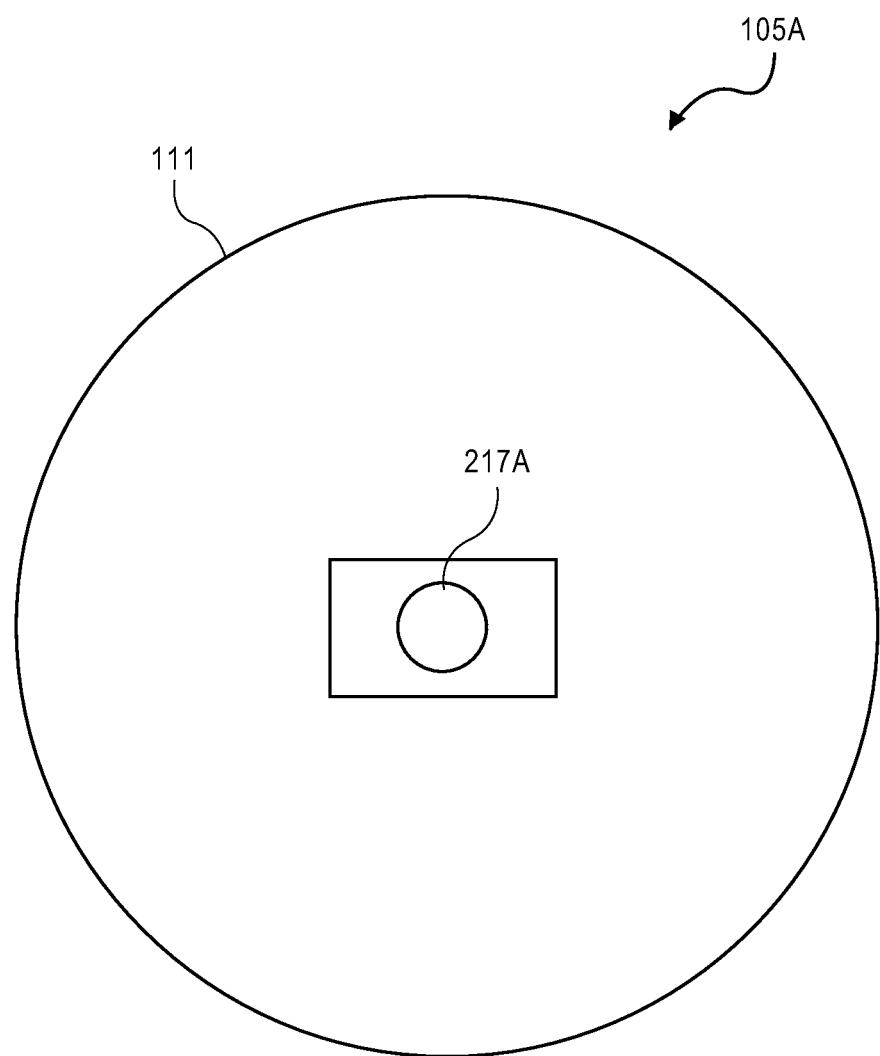
FIG. 7A shows an overhead view of the bottom end of a loudspeaker with an integrated camera facing downwards according to one embodiment.
Figure 7B:
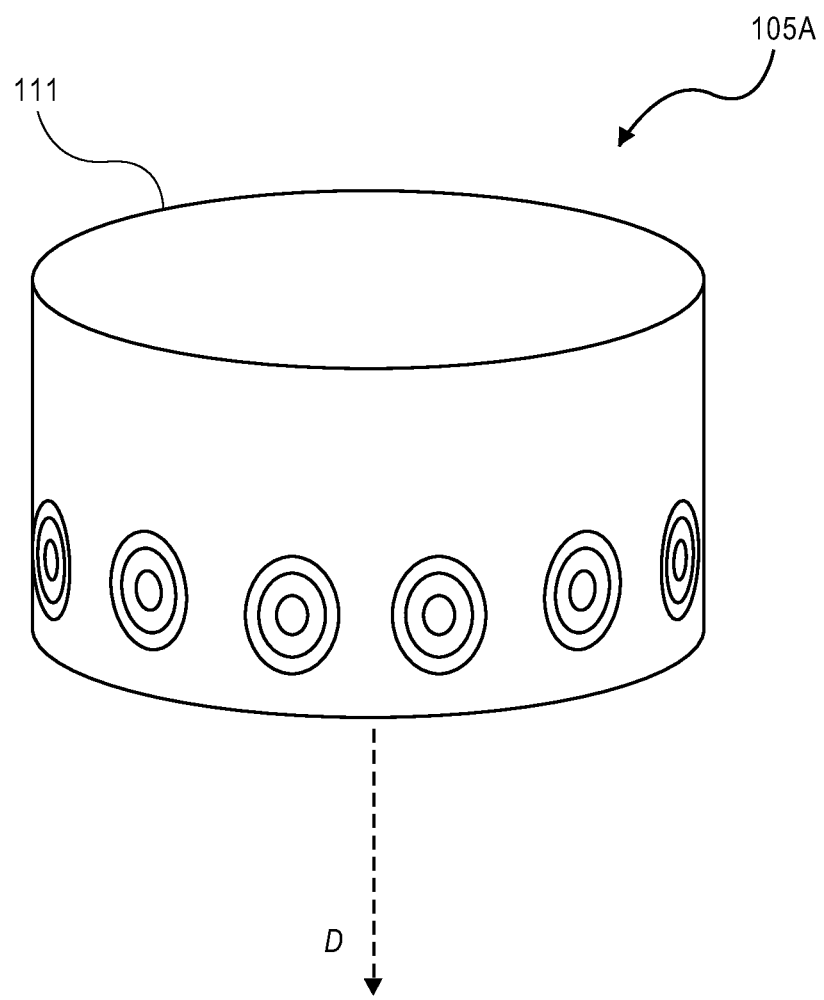
FIG. 7B shows the direction/perspective captured by the camera integrated within the loudspeaker according to one embodiment.

In one embodiment, a still image camera or video camera may be affixed to the loudspeakers 105A for determining movement and/or reorientation of the loudspeaker. For example, one or more cameras may be located on the top and/or or bottom ends of the cabinet 111. In one embodiment, the cameras may be focused/directed directly downwards and/or upwards relative to the bottom or top ends of the loudspeaker 105A (i.e., the optical axis of the camera is pointed at 90° relative to the surface of the top or bottom ends of the loudspeaker 105A). For example, FIG. 7A shows an overhead view looking down into the cabinet 111, of the bottom end of the loudspeaker 105A (the transducers 109 are omitted from this drawing). As shown, the camera 217A is placed on the bottom end such that the camera 217A is looking downward, as demonstrated by the arrow D in FIG. 7B. In this embodiment, the camera may view the surface upon which the loudspeaker 105A is seated, such as the floor or a tabletop. As noted above, in some embodiments, a camera may be placed on the top end of the loudspeaker 105A in a similar fashion as described above in relation to FIGS. 7A and 7B such that the camera may view the ceiling or other structures above the loudspeaker 105A.

The one or more cameras of the loudspeaker 105A may capture images at regular intervals or in response to another triggering event. For example, a camera located along the bottom end of the loudspeaker 105A may capture still images of the floor, table, or another surface on which the loudspeaker 105A is situated at one minute intervals. However, in other embodiments, other time intervals may be used.

The captured images may be compared to each other, to determine if the loudspeaker 105A has moved to a new location (e.g., moved since operation 601). These comparisons may utilize pattern recognition/matching techniques to reveal movement. For example, an identified pattern in the wood grain of a hardwood floor captured in a first image at operation 601 may be located on the far right edge of the first image. In contrast, the same pattern captured in a second (subsequently capture) image at operation 609 may be located on the center of the second image. This apparent shift in the pattern may indicate that the loudspeaker 105A has moved to the left between operations 601 and 609. In one embodiment, the distance of movement of the loudspeaker 105A may be determined based on a distance between the pattern in the first image and a distance of the pattern in the second image. As described in greater detail below, this determined distance and direction of movement for the loudspeaker 105A may be used to generate a new set of parameters for driving the loudspeaker 105A and/or the loudspeaker 105B without the need for a full recalibration of the loudspeakers 105A and 105B.

In the example provided above, the pattern in the floor is identified in both the first image and the second image. However, in other embodiments, movement may be determined based on the absence of the pattern in the second image. Since the pattern is not located in the second image, operation 609 may determine that the loudspeaker 105A has moved, but may fail to conclude a specific distance and/or direction of movement. In this embodiment, as will be described in greater detail below, a full recalibration of the loudspeakers 105A and 105B may be performed since the degree and direction of movement may be unknown.

In one embodiment, tilting or rotation of the loudspeaker 105A may be determined based on the detection that the pattern identified in the first image has been captured from a different perspective/angle and/or has rotated in the second image. In this embodiment, a specific degree of tilt or rotation may be determined based on the differences in each of the first and second images.

In one embodiment, the pattern observed in the first image may appear larger or smaller in the second image. This change in apparent size may indicate that the loudspeaker 105A has been raised or lowered (e.g., mounted on a wall or demounted and placed on the floor). In this embodiment, a specific distance of movement may be determined based on the change in pattern size between the first and second images.

Although described above in relation to a still image camera, in some embodiments a video camera may be used. In this embodiment, the video camera may capture video at specified intervals for a predetermined duration and/or in response to another triggering event. The captured videos may be examined to determine movement and/or determine a direction and degree of movement in a similar fashion as described above in relation to the still image camera.

The cameras used for the loudspeaker 105A may utilize any image/video capture technology. For example, the cameras may use charge-couple device (CCD) and/or complementary metal-oxide-semiconductor (CMOS) active pixel sensors. In some embodiments, the cameras may utilize low frame rate sensors (e.g., ten frames per second) and/or low fidelity sensors such as those used in computer mice. By using reduced capability sensors, the cameras used in the loudspeaker 105A may consume less energy and provide a more compact fit in comparison to other higher quality devices while not significantly compromising relative movement estimates.

Compass

In one embodiment, the loudspeaker 105A may include a compass for determining an altered orientation of the loudspeaker 105A. In this embodiment, movement of the loudspeaker 105A may trigger a corresponding, different heading output from the compass indicating the degree of rotation. For example, rotating the loudspeaker 105A fifteen degrees counterclockwise may produce an output of −15° while rotating the loudspeaker 105A fifteen degrees clockwise may produce an output of 15°. Accordingly, both the direction of rotation and degree of rotation may be determined by the compass. The compass may utilize any type of sensor technology. For example, the compass may be a magnetic compass or a gyrocompass.

Gyroscope

In one embodiment, the loudspeaker 105A may include a gyroscope for detecting the tilt and/or rotation of the loudspeaker 105A. For example, the gyroscope may determine the amount that the loudspeaker 105A has rotated or titled relative to a previous orientation (e.g., the orientation of the loudspeaker 105A at operation 601). Similar to the compass, the gyroscope may output the degree and direction of orientation change. The gyroscope may use any type of sensor technology, for example, the gyroscope may be a micro electro-mechanical system (MEMS) gyroscope, a fiber optic gyroscope (FOG), a Hemispherical resonator gyroscope (HRG), a vibrating structure gyroscope (VSG), a dynamically tuned gyroscope (DTG), or a London moment gyroscope.

Light Sensor

In one embodiment, the loudspeaker 105A may include a light sensor for detecting the level of ambient light surrounding the loudspeaker 105A. The light sensor may be a photoresistor or a light-dependent resistor (LDR) that decreases resistance with increasing incident light. In one embodiment, the detection of more or less ambient light may indicate a change of environment for the loudspeaker 105A. For example, using heuristics, operation 609 may determine that the loudspeaker 105A is initially in an environment in which the level of light does not extend above a particular level during a designated period (e.g., a twenty-four hour period). Upon detection of a light level that exceeds this particular level or exceeds this level by a predetermined variance amount, operation 609 may determine that the loudspeaker 105A has moved to a new location. In response to this general determination of movement, a full recalibration of the loudspeaker 105A and/or the loudspeaker 105B may need to be performed as will be described below. Although described in relation to an upper light level, similar comparisons and determinations may be made regarding lower light levels.

Accelerometer

In one embodiment, the loudspeaker 105A may include an accelerometer for measuring acceleration of the loudspeaker 105A. For example, the accelerometer may detect that the loudspeaker 105A is accelerating at 0.2 meters per second. This acceleration information may be used to determine the total movement of the loudspeaker 105A and the direction of movement of the loudspeaker 105A. The accelerometer may be any type of accelerometer, including a capacitive accelerometer, a piezoelectric resistive accelerometer, a magnetic induction accelerometer, a micromechanical (MEMS) accelerometer, etc.

In one embodiment, readings from the accelerometer may be used to determine that the loudspeaker 105A has been moved to a new surface or has been mounted in a different fashion. For example, when the loudspeaker 105A is placed on a hard surface (e.g., a table or a hardwood floor), sound from the loudspeaker 105A may produce more severe vibrations than when the loudspeaker 105A is placed on a soft surface (e.g., a carpeted floor). Similarly, when the loudspeaker 105A is mounted on a rigid structure (e.g., mounted on a wall), sound from the loudspeaker 105A may produce more severe vibrations than when the loudspeaker 105A is not attached to a rigid structure (e.g., placed on a carpeted floor). These changes in placement of the loudspeaker 105A may indicate that the loudspeaker 105A has moved and/or the environment surrounding the loudspeaker 105A has changed (i.e., the loudspeaker 105A has been placed on a different surface).

Thermometer

In one embodiment, the loudspeaker 105A may include a thermometer for measuring the ambient temperature surrounding the loudspeaker 105A. In one embodiment, detection that a temperature output from the thermometer has exceeded a previous record temperature may indicate that the loudspeaker 105A has moved to another environment. For example, heuristic data may indicate that the loudspeaker 105A is typically in an area in which the ambient temperature never rises above 75° Fahrenheit. However, temperature readings at operation 609 may indicate the ambient temperature surrounding the loudspeaker 105A has increased to 90° Fahrenheit. This change in temperature may indicate that the loudspeaker 105A has moved relative to the previous readings. Similar inferences may also be made about regarding a historic low temperature level. In one embodiment, the temperature levels may be relative to time of year/season.

Antennas

In one embodiment, the loudspeaker 105A may include one or more antennas for detecting and/or transmitting wireless signals. In one embodiment, the antennas may be associated with the interface 213—see FIG. 2b. Accordingly, the antennas may be adapted/designed to operate with the IEEE 802.11 suite of standards, cellular Global System for Mobile Communications (GSM) standards, cellular Code Division Multiple Access (CDMA) standards, Long Term Evolution (LTE) standards, and/or Bluetooth standards.

In one embodiment, the antennas may be used to detect general wireless noise/signals in the area of the loudspeaker 105A at operation 609. Comparing these detected wireless signal/noise values with heuristic data, operation 609 may determine that the loudspeaker 105A has moved. For example, in some embodiments the loudspeaker 105A may have been initially located in an environment with a large degree of microwave noise and/or proximate to a wireless base station with a particular service set identifier (SSID). In response to detecting a drop in the level of microwave noise and/or a loss of detection of the base station, operation 609 may determine that the loudspeaker 105A has moved from this original location.

In one embodiment, triangulation of the loudspeaker 105A relative to multiple wireless devices may be performed to determine the exact location of the loudspeaker 105A. For example, using received signal strength indication (RSSI) readings from three or more wireless devices (e.g., access points, wireless controllers, mobile phones, etc.), the location of the loudspeaker 105A may be estimated. This estimated location may be compared against a previous location to determine whether the loudspeaker 105A has moved.

Microphones

In one embodiment, the loudspeaker 105A may include one or more microphones. The microphones may sense sounds and convert these sensed sounds into electrical signals. The microphones may be any type of acoustic-to-electric transducer or sensor, including a Micro Electro-Mechanical System (MEMS) microphone, a piezoelectric microphone, an electret condenser microphone, or a dynamic microphone. The microphones may be operated together as a microphone array. In such an embodiment, an array process may be performed that may utilize various weights and delays upon the microphone signals, to produce a range of polar sound pick up patterns, such as cardioid, omnidirectional, and figure-eight. The generated polar patterns alter the direction and area of sound captured in the vicinity of the loudspeaker 105A. In one embodiment, the polar patterns of the microphones may vary continuously over time.

In one embodiment, the microphones may be used to determine the location of the loudspeaker 105A relative to another sound source. For example, the microphones may detect sounds within the cabinet 111 of loudspeaker 105a, which were emitted from the loudspeaker 105B. Based on these detected sounds and knowledge of the time at which the sounds were originally played through the loudspeaker 105B or the level at which the sounds were played, operation 609 may determine a delay time and/or a level difference. These delay and level difference values may be used to estimate the relative distance between the loudspeaker 105A and the loudspeaker 105B based on a general or specific determination of the sound propagation in the listening area 101. Through comparison of these values with previous locations/distances, operation 609 may determine if the loudspeaker 105A has moved relative to another sound source and a direction and distance of movement.

Although described as calculation of location/distances relative to the loudspeaker 105B, in other embodiments other sound sources may be used. For example, in other embodiments sound from the listener 107 or noise from a stationary source (e.g., noise from the compressor of a refrigerator) may be used to calculate location/distances using similar techniques.

In one embodiment, the microphones may be used to determine characteristics of the environment in which the loudspeaker 105A is currently located. For example, the microphones may be used to detect sounds emitted by the loudspeaker 105A. The detected sounds may be analyzed to determine the presence of reflections, the level of reflections, and delays between the reflections and the original output sound. For instance, in one embodiment, large reflections that occur with minimal delay may indicate that the loudspeaker 105A is adjacent to a wall or other hard surfaces (e.g., furniture). In one embodiment, the presence and characteristics of reflections may be compared against previously detected sounds to determine whether the loudspeaker 105A has moved. For example, the lack of reflections or the reduction in the level of reflections in comparison to previous microphone readings may be indicative of movement of the loudspeaker 105A.

Pressure Sensor

In one embodiment, the loudspeaker 105A may include a pressure sensor for detecting the pressure surrounding the loudspeaker 105A. In one embodiment, the pressure sensor may be a microphone or a barometer. The pressure sensor may determine movement of the loudspeaker 105A based on changes in ambient pressure. For example, at operation 601 the barometric pressure may be detected to be 1000 millibars. In contrast, at operation 609 the barometric pressure may be detected to be 1100 millibars. This change in pressure may indicate that the loudspeaker 105A has changed environments and accordingly has moved. This movement may be attributed to being moved to a new floor within a building. In one embodiment, the pressure levels may be relative to time of year/season.

Current/Voltage Sensors

In one embodiment, the loudspeaker 105A may include a current/voltage monitor. The current/voltage monitor may monitor the current level and/or voltage level from a power outlet from which the loudspeaker 105A is receiving electricity. For example, the current/voltage sensor may indicate that the loudspeaker 105A is currently receiving 15 amps at 121 volts. In contrast, the current/voltage sensor may have previously have detected 14 amps at 119 volts. This change in current and/or voltage may indicate that the loudspeaker 105A has been plugged-in to a different outlet since the new measurement and accordingly has been moved between measurements.

In one embodiment, one or more of the sensor values described above may be used to determine movement of the loudspeaker 105A through comparison with an associated set of threshold and/or variance levels. For example, the determined current ambient light level may be compared at operation 609 with a threshold value provided by a previous measurement (e.g., an ambient light value recorded at operation 601). In response to determining that the ambient light value detected at operation 609 is different from the threshold ambient light value by a predefined variance amount, operation 609 may determine that the loudspeaker 105A has moved. As noted above, the threshold values may be time of year and time of day specific.

In one embodiment, the sensors 217 may record values at predetermined intervals (e.g., at one minute intervals). While in other embodiments, one or more of the sensors 217 may remain active at all times. In one embodiment, one of the sensors 217 may trigger another sensor 217 to power on. For example, an accelerometer, a gyroscope, a compass, or an antenna may be used to trigger a camera, a light sensor, a thermometer, a microphone, a pressure sensor, and/or a current/voltage sensor to power on. In these embodiments, upon the accelerometer, the gyroscope, the compass, and/or the antenna detecting movement as described above, one or more of these devices may trigger other sensors to power on. In this fashion, power may be conserved while still allowing potentially more power consuming sensors to operate to detect movement of the loudspeaker 105A.

Although described above in relation to analysis of individual sensors 217 to determine the movement or change of environment for the loudspeaker 105A, in other embodiments operation 609 may utilize a combination of two or more sensors 217 in this analysis. For example, operation 609 may determine an overall confidence of movement or change of environment based on readings from multiple sensors 217. In this embodiment, one sensor 217 may strongly indicate movement while multiple other sensors 217 may indicate that the loudspeaker 105A has not moved. Accordingly, operation 609 may conclude that the movement determination by the single sensor 217 is inaccurate based on the contrary conclusion of the majority of other sensors 217.

Similarly, in one embodiment, the degree and/or direction of movement of the loudspeaker 105A may be computed based on inputs from multiple sensors 217. For example, analysis of the readings from cameras may indicate that the loudspeaker 105A has moved one meter to the left while readings from antennas may indicate that the loudspeaker 105A has moved three meters to the left. In this example, operation 609 may average the two distance values and determine that the loudspeaker 105A has moved two meters to the left. Similar computations may be applied to directional values as well. Although described as a strict average between values, in other embodiments, weighted averages may be computed based on confidence levels in particular sensor 217 readings (e.g., confidence based on strength of signals, alignment of computed values with other computed estimates, and/or historical analysis of each estimate). In other embodiments, other statistical and analytical techniques may be employed at operation 609 to determine movement and the level of movement.

Upon determining at operation 609 that the loudspeaker 105A has moved, the method 600 may move to operation 611 to determine whether the movement is significant enough to warrant a full recalibration of the loudspeaker 105A and/or the loudspeaker 105B. For example, when operation 609 determines a distance of movement and/or a degree of reorientation (e.g., rotation or tilting), operation 611 may compare these values against a set of predefined thresholds. In this embodiment, when the determined values from operation 609 are determined to be relatively minor (e.g., less than the threshold values), the method 600 may move to operation 613 to adjust the first set of parameters based on the values from operation 609.

As noted above, the parameters may include delays, level differences, gain values, and/or phase values for driving each of the transducers 109 in the loudspeakers 105A and/or 105B. Since the level of movement/reorientation determined at operation 609 is relatively small based on comparison with threshold values at operation 611, "small" adjustments may be made to the first set of parameters at operation 613 to produce a second set of parameters (without again ascertaining the complete environment of the loudspeakers 105a, 105b, or without recalibrating the system to thereby generate a new set of parameters or settings for driving the transducers 109). The adjustments produced at operation 613 may be based on previously known similar configurations and/or other heuristic values. For example, the adjustment at operation 613 may be based on models of the positioning of the loudspeaker 105A, the loudspeaker 105B, and/or the listener 107. Further, the adjustment allows sound produced by the loudspeaker 105A and/or 105B to remain similar or identical at the location of the listener 107, despite not having recalibrated or ascertained the complete environment. Namely, the second (adjusted) set of parameters ensure that the level of sound and apparent direction of sound produced by the loudspeakers 105A and/or 105B, at the listener 107, after the movement detected at operation 609, is similar or identical to levels and directions at the listener 107 prior to the movement of the loudspeaker 105A when the first set of parameters were utilized.

When the determined values from operation 609 are 1) determined to be significant at operation 611 (i.e., above the predefined threshold values) or 2) operation 609 failed to produce specific movement or change of environment values (i.e., operation 609 only determines that the loudspeaker 105A has generally moved), the method 600 may move to operation 615. At operation 615 a full recalibration of the loudspeaker 105A and/or the loudspeaker 105B may be performed, to produce the second set of parameters. The full recalibration may include the use of a separate device apart from the loudspeakers 105A and 105B and the audio receiver 103, for determining the location, orientation, and environment of the loudspeakers 105A and 105B. As noted above, this full recalibration may include playing a set of audible or inaudible test sounds through the loudspeakers 105A and/or 105B, and detection of these test sounds by a separate listening device that may be located proximate to the listener 107. However, in other embodiments, other recalibration techniques may be used, including techniques that are based on inputs received from the sensors 217.

Following generation of the second set of parameters either through small adjustments of the first set of parameters at operation 613 or through a full recalibration at operation 615, operation 617 may play the piece of sound program content received at operation 603 using the second set of parameters. Similar to the first set of parameters, the second set of parameters allows the production of an intended set of sounds at the location of the listener 107, based on the new configuration of the loudspeaker 105A (by generating the drive signals for the transducers 109 in accordance with the second set of parameters.) As described above, by detecting movement of the loudspeaker 105A and attempting to first "merely adjust" the parameters used to drive the loudspeakers 105A and/or 105B, before performing a full recalibration, the method 600 provides a more efficient scheme for ensuring accurate playback of audio in the listening area 101.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for adjusting drive parameters for one or more loudspeakers, comprising:
   determining a first set of drive parameters for driving the one or more loudspeakers with, based on sensing of an environment of a listening area of the one or more loudspeakers with a separate device;
   detecting a change to the environment of the one or more loudspeakers based on one or more sensors of the one or more loudspeakers; and adjusting, in response to the detected change to the environment being below a threshold amount, the first set of drive parameters to produce a second set of drive parameters having a change in delays and gain values as compared to the first set of drive parameters of the one or more loudspeakers to compensate for the detected change to the environment, the second set of drive parameters being used to drive the one or more loudspeakers.

2. The method of claim 1, further comprising, if the detected change is not below the threshold amount, performing a full recalibration with the separate device, to determine the environment of the listening area, and producing the second set of drive parameters having the change in delays and gain values as compared to the first set of drive parameters of the one or more loudspeakers.

3. The method of claim 2, wherein the full recalibration includes performing a series of sounds played by the one or more loudspeakers and detected by one or more microphones of the separate device.

4. The method of claim 1, wherein the separate device includes at least one of a mobile device, a smartphone, a headset, or a tablet computer.

5. The method of claim 1, wherein the change to the environment includes change to at least one of a) surfaces, including walls, ceiling, or floor; and b) objects, including furniture within the listening area.

6. The method of claim 1, wherein the change to the environment includes change to at least one of distance between the one or more loudspeakers, and distance from the one or more loudspeakers and a listener.

7. The method of claim 1, wherein the change to the environment includes at least one of vertical movement, horizontal movement, tilt movement, and rotational movement of the one or more loudspeakers.

8. The method of claim 1, wherein the one or more sensors of the one or more loudspeakers includes at least one of one or more microphones, a video camera, a still image camera, a compass, an accelerometer, a light sensor, a wireless antenna, a thermometer, a current and voltage monitor, a gyroscope, and a pressure monitor.

9. The method of claim 1, wherein the one or more loudspeakers produce respective beam patterns when driven by the first set of drive parameters or the second set of drive parameters.

10. A loudspeaker, comprising:
a cabinet forming a structure of the loudspeaker;
an array of transducers;
one or more sensors; and
a processor, configured to perform the following:
determining a first set of drive parameters for driving the loudspeaker with, based on sensing of an environment of a listening area of the loudspeaker with a separate device;
detecting a change to the environment of loudspeaker based on the one or more sensors; and
adjusting, in response to the detected change being below a threshold amount, the first set of drive parameters to produce a second set of drive parameters having a change in delays and gain values as compared to the first set of drive parameters to compensate for the detected change to the environment, the second set of drive parameters being used to drive the loudspeaker.

11. The loudspeaker of claim 10, wherein the processor is further configured to perform the following: if the detected change is not below the threshold amount, performing a full recalibration with the separate device, to determine the environment of the listening area; and producing the second set of drive parameters having the change in delays and gain values as compared to the first set of drive parameters of the one or more loudspeakers.

12. The loudspeaker of claim 11, wherein the full recalibration includes performing a series of sounds played by the loudspeaker and detected by one or more microphones of the separate device.

13. The loudspeaker of claim 10, wherein the separate device includes at least one of a mobile device, a smartphone, a headset, or a tablet computer.

14. The loudspeaker of claim 10, wherein the change to the environment includes change to at least one of a) surfaces, including walls, ceiling, or floor; and b) objects, including furniture within the listening area.

15. The loudspeaker of claim 10, wherein the change to the environment includes change to distance from the loudspeaker and a listener.

16. The loudspeaker of claim 10, wherein the change to the environment includes at least one of vertical movement, horizontal movement, tilt movement, and rotational movement of the loudspeaker.

17. The loudspeaker of claim 10, wherein the one or more sensors of the loudspeaker includes at least one of one or more microphones, a video camera, a still image camera, a compass, an accelerometer, a light sensor, a wireless antenna, a thermometer, a current and voltage monitor, a gyroscope, and a pressure monitor.

18. A method, comprising:
sensing, with one or more microphones of a mobile device, an environment of a listening area; wherein
a first set of drive parameters for driving one or more loudspeakers are determined, based on the sensing of the environment of the listening area,
a change to the environment of the one or more loudspeakers is detected based on one or more sensors of the one or more loudspeakers, and
in response to the detected change to the environment being below a threshold amount, the first set of drive parameters is adjusted to produce a second set of drive parameters having a change in delays and gain values as compared to the first set of drive parameters of the one or more loudspeakers to compensate for the detected change to the environment, the second set of drive parameters being used to drive the one or more loudspeakers.

* * * * *